US010001367B2

(12) United States Patent
Anderson (10) Patent No.: US 10,001,367 B2
(45) Date of Patent: Jun. 19, 2018

(54) FIBER OPTIC POSITION SENSOR AND METHOD FOR USING

(71) Applicant: The Boeing Company, Chicago, IL (US)

(72) Inventor: Steven A. Anderson, St. Louis, MO (US)

(73) Assignee: The Boeing Company, Chicago, IL (US)

( * ) Notice: Subject to any disclaimer, the term of this patent is extended or adjusted under 35 U.S.C. 154(b) by 177 days.

(21) Appl. No.: 13/901,793

(22) Filed: May 24, 2013

(65) Prior Publication Data

US 2014/0347674 A1    Nov. 27, 2014

(51) Int. Cl.
| G01B 11/14 | (2006.01) |
| G01D 5/26 | (2006.01) |
| G01D 5/34 | (2006.01) |
| G02B 6/35 | (2006.01) |

(52) U.S. Cl.
CPC ............. G01B 11/14 (2013.01); G01D 5/268 (2013.01); G01D 5/342 (2013.01); G02B 6/3514 (2013.01); G02B 6/3552 (2013.01); G02B 6/3574 (2013.01)

(58) Field of Classification Search
CPC ........ G02B 6/35; G02B 6/351; G02B 6/3528; G02B 6/353; H01H 9/00; G01D 5/342–5/35374
See application file for complete search history.

(56) References Cited

U.S. PATENT DOCUMENTS

| 2,987,960 | A | * | 6/1961 | Sheldon | A61B 1/00183 |
| | | | | | 356/241.5 |
| 4,315,147 | A | * | 2/1982 | Harmer | 250/227.22 |
| 5,101,463 | A | * | 3/1992 | Cubukciyan | G02B 6/3831 |
| | | | | | 385/69 |
| 5,133,030 | A | * | 7/1992 | Lee | 385/19 |

(Continued)

FOREIGN PATENT DOCUMENTS

| DE | 202009008971 | 8/2009 |
| GB | 2078943 | 1/1982 |

(Continued)

OTHER PUBLICATIONS

Micronor Invents World's First Absolute Fiber Optic Position Sensor: http://www.businesswire.com/news/home/20110531007134/en/Microner-Invents-Worlds-Absolute-Fiber-Optic-Position.

(Continued)

*Primary Examiner* — Tri Ton
*Assistant Examiner* — Rebecca C Bryant
(74) *Attorney, Agent, or Firm* — Kunzler, PC (57) ABSTRACT

A method and apparatus are provided for detecting both an absence and a presence of a light beam moving in an optical fiber to determine the position of a component. The method is carried out by the apparatus which includes a plunger having first and second positions coordinated with first and second component positions respectively. The optical fiber is capable of having a light beam move in a first direction and of having the light beam move in a reverse direction in the optical fiber. A detector is provided for indicating the absence of the reverse direction of the light beam moving in the optical fiber and for indicating the presence of the light beam moving in the first direction in the optical fiber.

16 Claims, 4 Drawing Sheets

(56) References Cited

U.S. PATENT DOCUMENTS

| | | | | |
|---|---|---|---|---|
| 5,216,246 A | * | 6/1993 | Weidman et al. | 250/229 |
| 5,418,645 A | * | 5/1995 | Coath | G02B 7/10 |
| | | | | 359/676 |
| 5,461,683 A | * | 10/1995 | Harman | 385/21 |
| 7,660,494 B2 | | 2/2010 | Anderson | |
| 2003/0081885 A1 | | 5/2003 | Chen | |
| 2007/0024275 A1 | * | 2/2007 | Rudd, III | 324/207.26 |

FOREIGN PATENT DOCUMENTS

| | | |
|---|---|---|
| WO | 8505697 | 12/1985 |
| WO | 2005011511 | 2/2005 |

OTHER PUBLICATIONS

Extended European Search Report, Patent Application No. 14168256.7 dated Feb. 13, 2015.
Examination Report for European Patent Application No. 14168256.7 dated Mar. 23, 2018.

* cited by examiner

FIBER OPTIC POSITION SENSOR AND METHOD FOR USING

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD

Certain embodiments of the disclosure relate generally to fiber optic position sensors for use in the control of mechanical systems and methods for using the sensors. More specifically, certain embodiments of the disclosure relate to fiber optic position sensors that are particularly useful for controlling mechanical systems in aircraft such as for indicating the open and closed positions of landing gear and of various aircraft door operating systems.

BACKGROUND

Fiber optic technology is a relatively new form of technology particularly used in communication systems, such as for the transmission of telephone signals, internet communication systems and cable television signals. Simply stated, fiber optic technology comprises a system of transmitting information by using pulses of light through an optical fiber assembly. Fiber optic technology is a fairly recent development that started in the 1970s.

One principal advantage of fiber optic communication systems is that there is virtually non-existent electromagnetic interference (EMI) when using optical fibers in an operating system. The lack of EMI issues is a very significant benefit as it results in a high level of reliability. Another distinct advantage of fiber optic usage to the aircraft industry is that fiber optic systems are much lighter in weight than copper and aluminum wiring used in aircraft. The reduction in weight of wiring used in aircraft is a significant benefit since any reduction in weight of an aircraft improves fuel efficiency levels.

Position sensors are commonly used in aircraft for a variety of purposes. One broad area of use of position sensors involves indicator lights indicating whether any of the various doors used in aircraft are in the open or closed positions. Position sensors used in connection with commercial aircraft components include, but are not limited to passenger entry/exit doors, emergency doors, cockpit security doors, landing gear doors, and landing gear assemblies themselves; in military aircraft, position sensors are useful in indicating whether bomb bay doors are open or closed.

Further limitations and disadvantages of conventional and traditional approaches will become apparent to one of skill in the art, through comparison of such systems with the present disclosure as set forth in the remainder of the present application with reference to the drawings.

BRIEF SUMMARY

In one aspect of the disclosure, a position sensor is provided for detecting both an absence and a presence of a light beam moving in an optical fiber and detecting first and second component positions of a structure. The position sensor includes a frame and a plunger linearly and reciprocally mounted along an axis on the frame. The plunger has first and second plunger positions and is coordinated with the first and second component positions respectively. The optical fiber is mounted on the frame and is capable of having the light beam move in a first direction in the optical fiber at all times and is capable of having the light beam move in a reverse direction in the optical fiber member when the component position changes between the first and second component positions and when the plunger position changes between the first and second plunger positions in coordination with the first and second component positions. A detector indicates the absence of the reverse direction of the light beam moving in the optical fiber and indicates the presence of the light beam moving in the first direction in the optical fiber.

In another aspect of the disclosure, a position sensor is provided for detecting the presence of a light beam and the absence of a light beam moving in an optical fiber for providing a position signal of a component of an operating system of a structure. The position sensor includes a frame with a plunger linearly and reciprocally mounted along an axis on the frame between first and second positions. The optical fiber is mounted on the frame and is capable of having the light beam move in a first direction and in a reverse direction in the optical fiber. A prism is mounted in the frame for redirecting the light beam moving in a first direction in the optical fiber to at least the axis of the plunger and for redirecting the light beam moving in a reverse direction from the axis to the optical fiber. A reflector is mounted in the frame and has both an inoperative position and an operative position. The reflector, when in the operative position, reflects the light beam from the first direction into the reverse direction to the prism and the prism directs the light beam in the reverse direction into the optical fiber while providing a position signal of the presence of the reverse direction of the light beam in the optical fiber. A light beam absorber is mounted in the frame and has an inoperative condition and an operative condition. When the light beam absorber is in the operative condition, the light beam is absorbed and prevents the reverse direction of the light beam in the optical fiber. The reflector is in the inoperative condition when the light beam is in the operative condition, while providing a position signal of the absence of the reverse direction of the light beam in the optical fiber.

In a still further aspect of the disclosure, a method is provided for detecting both the absence and the presence of a light beam moving in an optical fiber for determining the position of a component. The optical fiber that is provided has the capability of having a light beam move in a first direction in the optical fiber and is capable of having the light beam move in a reverse direction in the optical fiber when the position of the component has changed. The absence of the light beam is detected when the light beam is not moving in the reverse direction in the optical fiber.

The features, functions, and advantages that have been discussed can be achieved independently in various embodiments or may be combined in yet other embodiments, further details of which can be seen with reference to the following description and drawings.

DETAILED DESCRIPTION

By combining the benefits of fiber optics with the range of possible uses for position sensors in aircraft, it would be highly desirable to provide a fiber optic position sensor in connection with systems related to indicators for open and closed positions of various moveable parts, such as doors and landing gear on an aircraft. Such moveable parts have operating systems The combining of fiber optics with position sensors in aircraft would provide light weight communications with high reliability and minimal or no electromagnetic interference (EMI) with the position sensors. The operating systems of the moveable parts, as will be described herein, are communicatively coupled to the position sensors.

The following description and accompanying drawings provide details of a fiber optic position sensor for detecting the presence or absence of a light beam in an operating system. The description, as follows, is not to be considered in a limiting sense, but it is provided for the purpose of illustrating the general principle of the claims relating to the described fiber optic position sensor and method for its use. The scope of the disclosure will be defined by the claims following the detailed description.

The description of the fiber optic position sensor is, for purposes of illustration, primarily directed to use with aircraft of the type that use a wide range of components, such as doors, that utilize indicator lights for indicating open and closed positions on any or all of the doors on the aircraft. The fiber optic position sensor being described herein is not limited for use with aircraft, but is intended to include a wide range of structures including fixed land based structures and vehicles, ships at sea and any type of aircraft or aerospace vehicles. Further, the components used in connection with the fiber optic sensors extend over a wide range.

Figure 1:
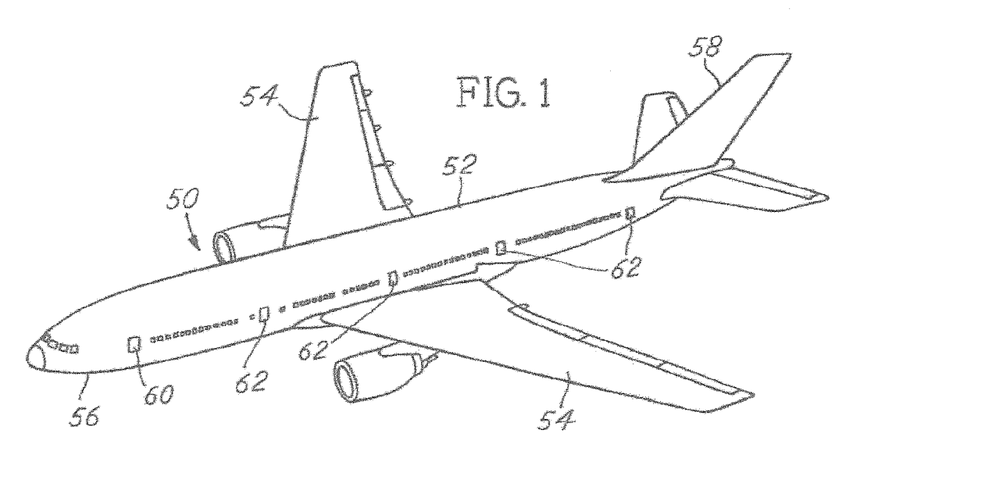
FIG. 1 is pictorial view of an aircraft having multiple doors thereon wherein fiber optic position sensors can be utilized for detecting open and closed positions of the doors.

Referring to FIG. 1, the pictorial view shows an aircraft, generally 50, of conventional design. The aircraft 50 is provided with a fuselage, generally 52, wings 54, fixedly mounted on the opposite sides of the fuselage 52, a nose section 56 and a tail section, generally 58. Of particular interest relative to the present disclosure are the passenger/exit door 60 and multiple emergency exit doors 62, all of which are provided along the length of the fuselage 52.

Figure 2:
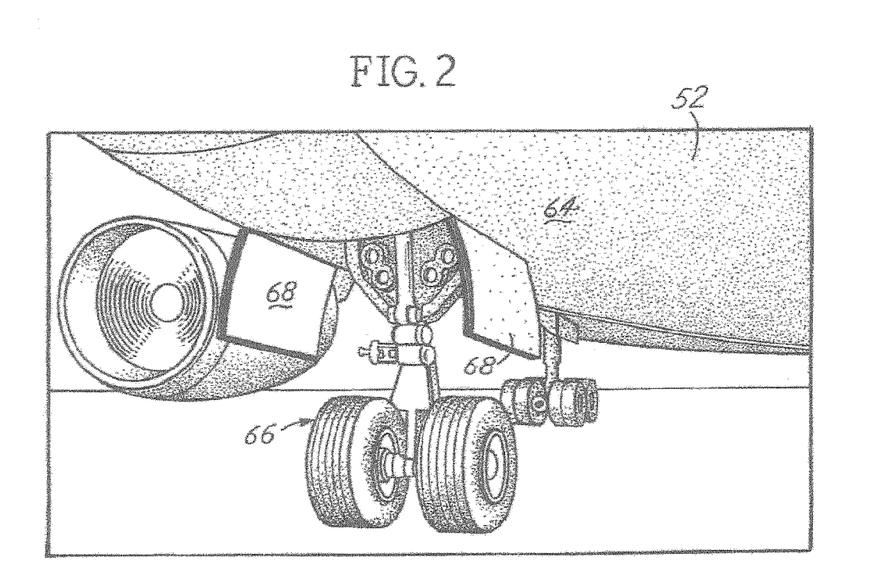
FIG. 2 is pictorial view of the underside of an aircraft showing the lowered position of a landing gear and the open position of landing gear doors; wherein fiber optic position sensors may be utilized for indicating such positions.
Figure 3:
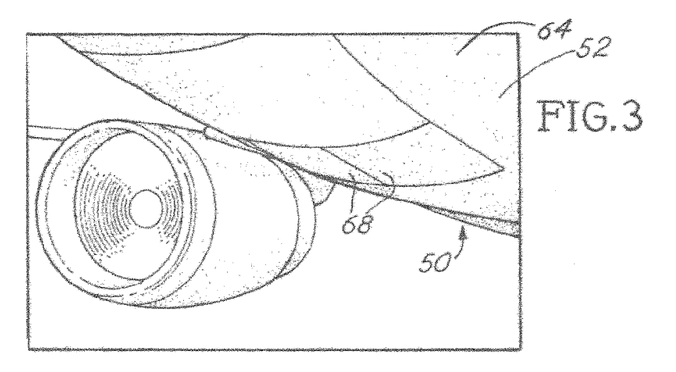
FIG. 3 is a view similar to FIG. 2 showing the landing gear doors in the closed position.

Referring to FIGS. 2 and 3, there is shown the underside 64 of the fuselage 52. FIG. 2 shows a landing gear, generally 66, in the lowered position and also shows a pair of landing gear doors 68 hingedly secured to the underside 64 of the fuselage 52 by hinge mechanisms (not shown) of conventional design. Referring to FIG. 3, there is a showing of the underside 64 of the fuselage 52 wherein the landing gear doors 68 are in the closed position and the landing gear 66 is in a retracted position in the aircraft 50.

Normally Open Sensor

Figure 4:
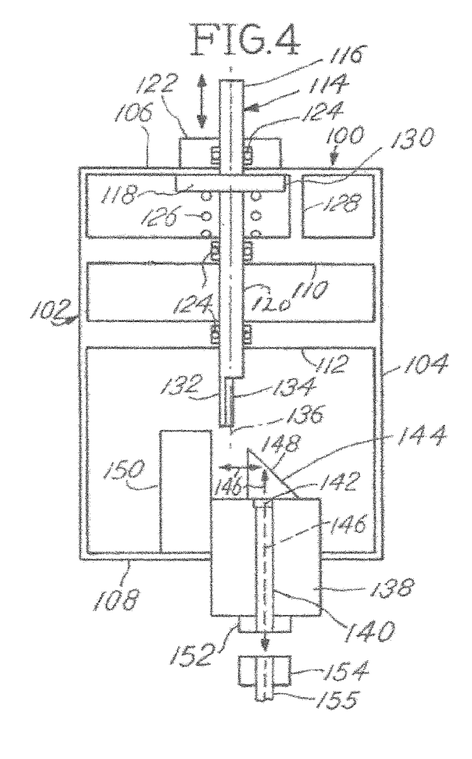
FIG. 4 is a view of a fiber optic position sensor of a normally open type of sensor.

Referring to FIG. 4, there is shown a fiber optic position sensor, generally 100, of the normally open type which is one type of fiber optic position sensor to be described herein. The sensor 100 is schematically shown as having a frame, generally 102. The frame 102 includes an outer cylindrical wall 104 which provides an enclosed space for the sensor components contained therein. The outer wall 104 is enclosed by an upper wall 106 and a lower wall 108. The frame 102 further includes an upper platform 110 that is supported by the outer wall 104. The upper platform 110 is spaced downwardly from the upper wall 106. A lower platform 112 is spaced downwardly from the upper platform 110 and is supported on its outer edge by the outer wall 104.

A plunger assembly, generally 114 is mounted in an aperture provided in the upper wall 106 of the frame 102. The plunger assembly 114 includes an upwardly projecting portion 116 which projects above the upper wall 106 of the outer frame 102. The plunger assembly 114 includes a unitary shoulder 118. The plunger assembly 114 is generally cylindrical in shape. The plunger assembly 114 also includes an interior lower portion 120. A threaded boss 122 is schematically shown and is provided with a jam nut to secure the fiber optic position sensor 100 to the aircraft 50 operatively near to a movable component of the aircraft 50 such as the fuselage doors 60 and 62, the landing gear doors 68 or the landing gear 64. A seal 124 is provided in the boss 122 for slideably and sealably guiding the cylindrical plunger 116. In a similar manner, the upper platform 110 and lower platform 112 of the frame 102 each includes seals 124 to provide similar guiding support for the reciprocal movement of the plunger assembly 114 within the frame 102. The frame 102 provides an enclosure for the interior components of the sensor 100 to be described. The seals 124 cooperate with the enclosed frame to avoid any exterior contamination from entering the enclosed frame 102.

A biasing spring 126 bears against a unitary shoulder 118 of the plunger assembly 114 at its upper end. At the lower end, the spring 126 rests against the upper surface of the upper platform 110. The biasing spring 126 acts to bias the plunger assembly 114 upwardly to position the upwardly projecting portion 116 above the threaded boss assembly 122. In the position shown in FIG. 4, the plunger assembly 114 is in a rest position. As will be described hereinafter, the plunger assembly 114 has an activated position when the plunger assembly 114 is moved downwardly such as by a component of a door 60, such as doors 60, 62 and 68. One flat side 130 of the unitary shoulder 118 of the plunger assembly 114 is in close slideable proximity to a flat upright wall 128 that is fixed to the upper wall 106 and to the upper platform 110. With the flat side 130 of the shoulder 118 of the plunger assembly 114 bearing against the flat wall 128, during reciprocal movement of the plunger assembly 114, rotation of the plunger assembly 114 is prevented. It is to be understood that other types of guides may be provided for preventing rotation of the plunger assembly 114.

The lower end 132 of the plunger assembly 114 fixedly carries a planar reflector 134 for reflecting a light beam as will be hereinafter described in further detail. Since the plunger assembly 114 is prevented from rotating, the flat reflector 134 faces laterally directly outwardly at 90 degrees to an imaginary central axis 136 of the plunger assembly 114 as shown in dotted view that extends downwardly and beyond the lower end 132 of the plunger assembly 114.

The lower wall 108 of the frame 102 has a fiber optic assembly 138 securely mounted in an aperture provided therein. The fiber optic assembly 138 has a multi-mode optical fiber 140 secured therein. A collimating lens 142 is secured at the upper exit end of the multi-mode optical fiber 140 and is rigidly secured within the fiber optic assembly 138. The lens 142 is securely bonded within the fiber optic assembly 138 and is set securely in position against the upper surface of the multi-mode optical fiber 140. Immediately above the collimating lens 142, a prism 144 is rigidly secured to the upper surface of the fiber optic assembly 138. The collimating lens 142 focuses or narrows a light beam as represented by lines 146. The light beam 146 meets the hypotenuse 148 of the prism 144 and the prism 144 redirects the light beam at 90 degrees towards a light absorber 150. The light absorber 150 is secured to the lower wall 108 of the frame and is fixed in position against a side of the fiber optic assembly 138. The light absorber 150 is made of a known material, for example, a non-reflective material such as black foam. The light absorber 150 absorbs the light beam 146 so there is the absence of reverse movement of the light beam 146 in the optical fiber 140. A threaded boss 152 is secured to the lower surface of the fiber optic assembly 138. The multi-mode optical fiber 140 is a section that extends from the lower surface of the lens 142 to the lower surface of the threaded boss 152. From the above description it is seen that the optical fiber assembly 138, supports the optical fiber 140, the lens 142, and the prism 144.

Referring to the lower area of FIG. 4, a connector 154 has a multi-mode optical fiber extension member 155 secured therein. The connector 154 is secured to the threaded boss 152. The optical fiber member 155 has an end thereof securely pressed against the lower end of the section of the optical fiber 140 positioned in the optical fiber assembly 138. The optical fiber extension member 155 is connected to an operating member to be hereinafter described. The optical fiber extension member 155 is the same type of multi-mode optical fiber as the multi-mode optical fiber 140. In actual operation, the optical fiber 140 and the optical fiber extension member 155 function in a unitary and cooperative manner.

Method of Using Normally Open Sensor

Figure 7:
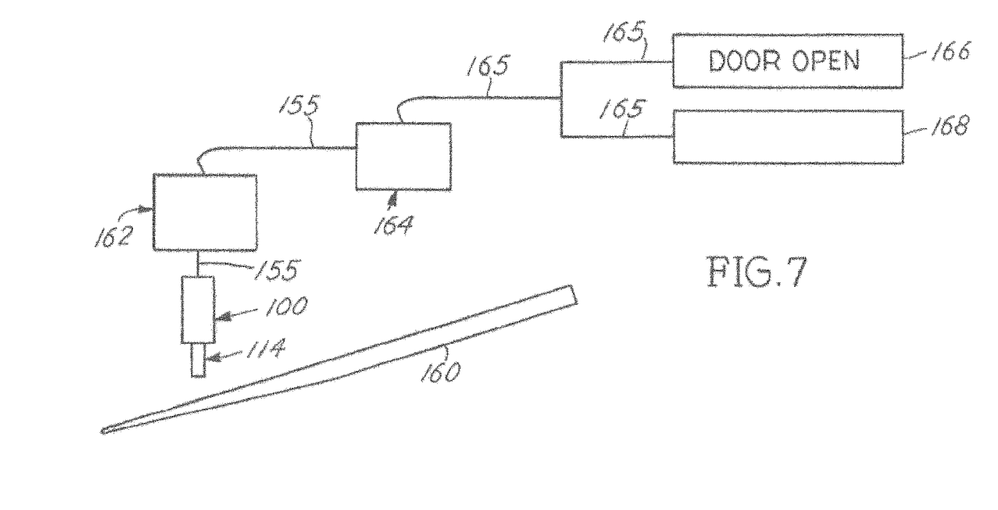
FIG. 7 is a view similar to FIG. 6 except showing the particular door of the aircraft in the open position.

Referring to FIG. 7, there is a provided a schematic drawing of the fiber optic position sensor 100 in which the plunger assembly 114 is in the rest position. FIG. 7 schematically shows a door 160 in the open position and with the sensor 100 in the rest position, that is, when the plunger assembly 114 is not depressed. The door 160 may be any type of door used on a wide variety of components and would include land based structures and vehicles, sea based ships at sea, and aircraft of all kinds, all of which have one or more doors that move between open and closed positions. For purpose of illustration, the door 160 is intended to reference landing gear doors 68 as shown in FIG. 2.

As shown in FIG. 7, the fiber optic position sensor 100 is in the rest position and the door 160 is in the open position. The fiber optic position sensor 100 is connected by an optical fiber member 155 to an optical transceiver 162. The optical transceiver 162 is connected by another optical fiber member 155 to a system controller, generally 164. The system controller 164 is connected by an electrical wire 165, such as copper wire, that is split into two electrical wires 165 with one wire 165 connected to a door open light 166 and with the other electrical wire 165 connected to a door closed light 168.

Referring to FIG. 4, in this position, the plunger assembly 114 is at rest. A light beam 146 passes through the multi-mode optical fiber 140, and then is passed through the collimating lens 142. The collimating lens 142 focuses the light beam 146 as it passes through the prism 144 and is reflected by the hypotenuse 148 of the prism 144 in a transverse direction through an open space. The light beam 146 is received by the light absorber 150. At this time, the fiber optic position sensor 100 indicates the absence of light since there is no reverse movement of the light beam 146 in the multi-mode optical fiber 140. In this way, an absence of the reverse movement of the light beam 146 in the optical fibers 140 and 155 is transmitted to the optical transceiver 162. The indicator light 166 indicates then that the door 160 is in the open position.

Figure 6:
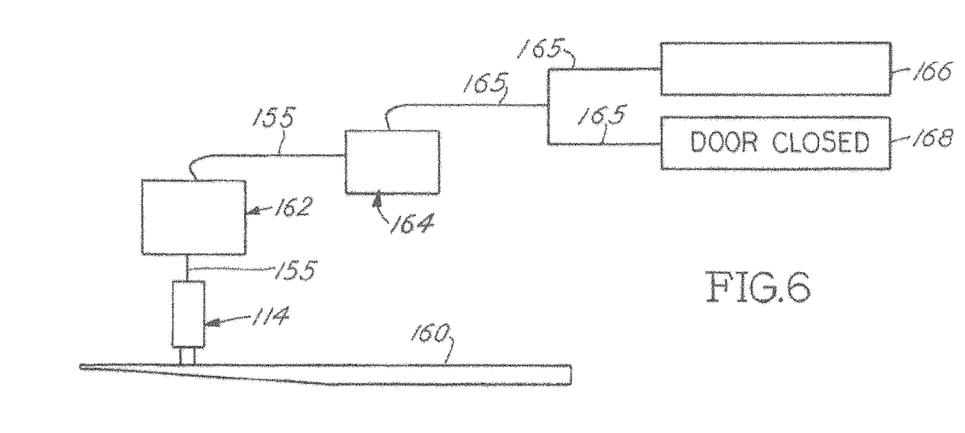
FIG. 6 is a schematic view showing a door of an aircraft in a closed position operatively connected to a fiber optic position sensor of a normally open type interconnected to a transceiver and the transceiver is connected to a controller which is connected to indicators, such as lights, indicating that a particular door is in the closed position, wherein fiber optic members interconnect the position sensor, the transceiver and the controller.

Referring to FIG. 6, when the door 160 is moved to the closed position, the plunger assembly 114 is depressed when the door 160 reaches the fully closed position. The lower end 132 of the plunger assembly 114 carries the reflector 134 which is positioned in the open space between the light absorber 150 and the prism 144. The light beam 148 intercepts the imaginary center line 136 of the plunger assembly 114. The plunger assembly 114 positions the reflector 134, carried at the lower end 132 of the plunger assembly 114, between the prism 144 and the light absorber 150. At this time, the reflector 134 reflects the light beam 148 back to the prism 144 which directs the light beam in a reverse direction through the optical fiber 140 and the optical fiber member 155. The reverse direction of the light beam 146 sends a presence of light signal back through the optical fiber 140 to the optical transceiver 162. This reverse direction of the light beam 146 signals the optical transceiver 162 that the door 160 is in the closed position. The optical transceiver 162 sends a signal to the system controller 164, through the optical fiber member 155, which in turn sends a signal through the electrical wire 165 to the indicator light 168 to indicate that the door 160 is in the door closed position.

Normally Closed Sensor

Figure 5:
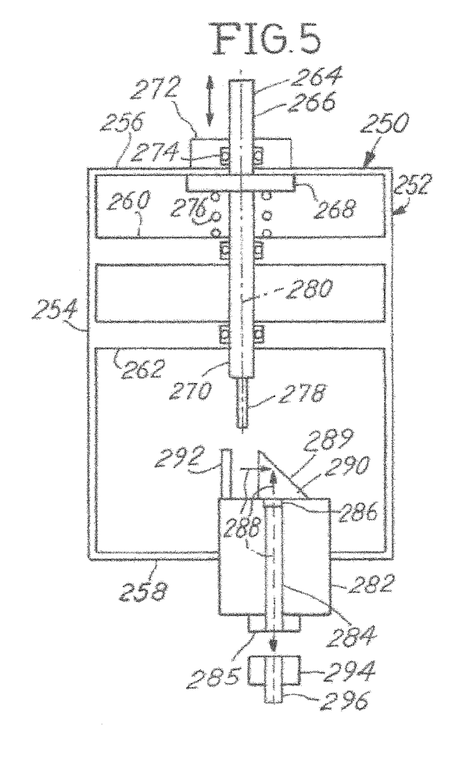
FIG. 5 is a view of a fiber optic position sensor of a normally closed type of sensor.

Referring to FIG. 5, there is shown a fiber optic position sensor, generally 250, of the normally closed type. The fiber optic position sensor 250 as shown in FIG. 5 is quite similar in both structure and method of use to the fiber optic position sensor 100. Both the normally open position sensor 100 and the normally closed position sensor 250 operate in a system that detects the presence of a light beam moving in a reverse direction in an optical fiber and alternatively that detects the absence of a light beam moving in a reverse direction in an optical fiber. The presence or absence of such a light beam provides a signal to an indicator light that, for example, a door on an aircraft is open or closed.

The normally closed sensor 250 of FIG. 5 includes an outer frame, generally 252. The outer frame 252 includes an outer wall 254, preferably cylindrical, that provides an enclosed space for isolating the sensor components, to be described, from exterior contamination. Like the normally open sensor 100, the outer wall 254 of the sensor 250 has an upper wall 256 and a lower wall 258 connected thereto. An upper platform 260 is spaced below the upper wall 256 and a lower platform 262 is spaced below the upper platform 260. Both platforms 260 and 262 are secured at their outer edges to the outer wall 254.

The normally closed sensor 250 has a plunger assembly, generally 264, mounted in an aperture provided in the upper wall 256 of the outer frame 252. The plunger assembly 264 includes an upwardly projecting portion 266 which projects above the upper wall 256. The plunger assembly 264 further includes a unitary shoulder 268. The plunger assembly 264 is generally cylindrical in shape. The plunger assembly 264 includes a lower portion 270. A threaded boss 272 is schematically shown and is secured to the upper wall 256 of the frame 252. The threaded boss 272 is provided with a jam nut for securing the sensor 250 to the aircraft 50 in operative proximity to a door of the aircraft 50 for signaling that the door is in an open or a closed position. A seal 274 is provided in the boss 272 for providing a guide support and seal for the reciprocal movement of the plunger assembly 264 within the frame 252 to seal the enclosed frame 252 from any potential exterior contamination.

A biasing spring 276 bears against the unitary shoulder 268 of the plunger assembly 264 at its upper end 266 and at its lower end, the biasing spring 276 rests against the upper surface of the upper platform 260. The biasing spring 276 acts to bias the plunger assembly 264 upwardly to position the upwardly projecting portion 266 above the threaded boss 272. As shown in FIG. 5, the plunger assembly 264 is shown in a rest position. The plunger assembly 264 has an activated position when the plunger assembly 264 is pushed downwardly as will be hereinafter described.

The lower end of the plunger assembly 264 carries a preferably cylindrical light absorber 278 for absorbing a light beam in a manner to be hereinafter described. The plunger assembly 264 includes an imaginary central axis 280 shown in dotted view that extends downwardly and beyond the lower end of the plunger assembly 264.

The lower wall 258 of the frame 252 has a fiber optic assembly 282 securely mounted in an aperture provided in the lower wall 258. The fiber optic assembly 282 has a multi-mode optical fiber 284 secured therein. A collimating lens 286 focuses or narrows a light beam as represented by lines 288. The collimating lens 286 is rigidly secured within the fiber optic assembly 282 and rests on top of the multi-mode optical fiber 284. The rapidly moving light beam 288 in the multi-mode optical fiber 284 passes through the lens 286 and the light beam 288 subsequently meets the hypotenuse 289 of a prism 290 which is in a fixed position on the fiber optic assembly 282 immediately above the collimating lens 286. The prism 290 redirects the light beam at a 90 degree angle. A light beam reflector 292 is mounted on the fiber optic assembly 282 and is spaced laterally away from the upright wall of the prism 290. The reflector 292 reflects the light beam 288 in a reverse direction back to the prism 290. The prism 290 reflects the light beam 288 in the reverse direction back through the collimating lens 286 and back through the multi-mode optical fiber 284. The multi-mode optical fiber 284 comprises a section that extends from the lower surface of the lens 286 to the lower surface of the threaded boss 285. The optical fiber assembly 282 supports the optical fiber 284, the lens 286, the prism 290 and the reflector 292.

The light beam interrupter or light absorber 278 is made of a known structure of a non-reflective material, such as black foam material. When the light absorber 278 is moved downwardly, in a manner to be hereinafter described, the light absorber 278 absorbs the light beam 288 before the light beam 288 can be reflected in a reverse direction by the reflector 292. When the plunger assembly 264 and light absorber 278 are raised to the rest position, the light beam 288 is reflected by the reflector 292 back to the prism 290 and then the prism 290 directs the light beam downwardly from the hypotenuse 291 of the prism 290 in a reverse direction through the section of multi-mode optical fiber 284 in the fiber optic assembly 282.

Referring to the lower area of FIG. 5, a connector 294 has a multi-mode optical fiber extension member 296 secured therein. The connector 294 is secured to the threaded boss 285. The optical fiber extension member 296 has one end thereof secured against the lower end of the optical fiber 284 which is secured in the optical fiber assembly 282. The optical fiber member 296 is connected to an operating member to be hereinafter described. The optical fiber member 296 is the same type of multi-mode optical fiber as the multi-mode optical fiber 284. In actual operation, the optical fiber 284 and the optical fiber member function in a unitary and cooperative manner.

Method of Using Normally Closed Sensor

The method of using the normally closed sensor 250 will be described with reference to FIGS. 5, 8 and 9.

Figure 9:
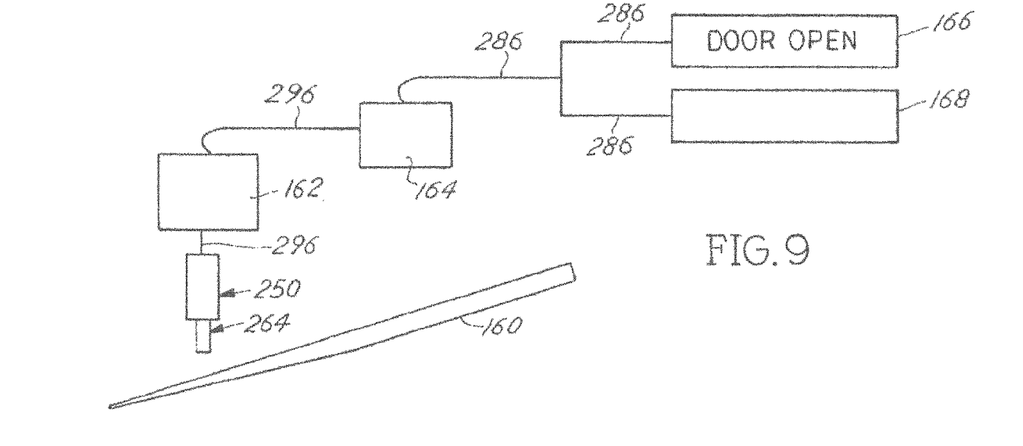
FIG. 9 is a view similar to FIG. 7 except the fiber optic position sensor is of the normally closed type.

Referring to FIG. 9, a door 160 is schematically shown and represents any of the doors 60, 62, and 68 on the aircraft 50. The door 160 is in the open position and the fiber optic position sensor 250 is in the rest position. The fiber optic position sensor 250 is connected to the optical transceiver 162 by an optical fiber extension member 296 and the optical transceiver 162 is connected to the system controller 164 by an optical fiber extension member 296. The system controller 164 is connected to the door open indicator light 166 and the door closed indicator light 168 by electrical wires 286, such as copper wires.

Referring to FIG. 9, the door 160 is in the open position and the fiber optic position sensor 250 is shown in the rest position. The sensor 250 is in the rest position and the plunger assembly 264 is in the rest position. The biasing spring 276 raises the plunger assembly 264 to the rest position. The light beam absorber 278 is cylindrical in shape and rests above the space between the reflector 292 and the prism 290. The optical transceiver 162 sends a light beam 288 through the optical fiber 284 and the collimating lens 286 focuses or narrows the light beam 288 to project against the hypotenuse 289 of the prism 290. The light beam 288 is reflected at approximately a 90 degree angle directly towards the reflector 292. The reflector 292 reflects the light beam 288 back to the prism 290 and the prism 290 then reflects the light beam 288 in a reverse direction back through the collimating lens 286 and through the multi-mode optical fiber 284 and the optical fiber member 296. The reverse direction of the light beam 288 sends a signal to the optical transceiver 162 that a reverse light beam 288 is present. The optical transceiver 162 transmits the signal back to the system controller 164 through the optical fiber extension member 296. The system controller 164 then sends a signal through the electrical wires 286 to the door open light indicator 168 signaling that the door 160 is open.

Figure 8:
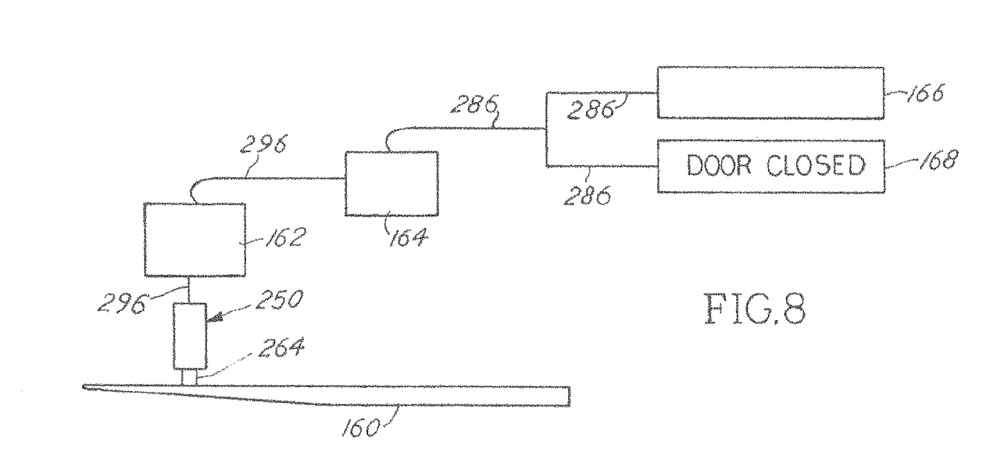
FIG. 8 is a view similar to FIG. 6 except the fiber optic position sensor is of the normally closed type.

Referring to FIG. 8, the door 160 is shown in the closed position. The plunger assembly 264 has been depressed in response to the closed door 160 and is moved downwardly within the frame 252. Referring to FIG. 5, the light beam absorber 278, which is preferably cylindrical in shape, is moved into the space between the reflector 292 and the prism 290. The light absorber 278 absorbs the light beam 288 and prevents the reverse direction of the light beam in the optical fiber 284 since the light beam 288 has been intercepted by the light absorber 278, the plunger assembly 264 having moved the light absorber 278 into the active position. In this way, there is no reverse movement of the light beam 288 from the light beam absorber 278. Since the light beam 288 has not moved in a reverse direction, a signal is received by the optical transceiver 162 that there is an absence of a reverse movement of a light beam 288 in the optical fiber 284. This information is transmitted from the transceiver 162 to the system controller 164 through an optical fiber extension member 296. The system controller 164 sends a signal through the electrical wires 286 to the door closed indicator light 168 advising that the door 160 is in the closed position.

While the disclosure has been described with reference to certain embodiments, it will be understood by those skilled in the art that various changes may be made and equivalents may be substituted without departing from the spirit and scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A position sensor for detecting first and second component positions of a component of a structure, the position sensor comprising:
    a frame comprising an outer enclosure and first, second, and third inner chambers within the outer enclosure, a platform separating the first and second inner chambers, and at least one seal between the first and third inner chambers, the at least one seal configured to prevent contamination from passing from the first inner chamber and the third inner chamber;
    a plunger, comprising a unitary shoulder with a flat side, linearly and reciprocally mounted along an axis on the frame, wherein the plunger extends from outside of the outer enclosure, entirely through the first and second inner chambers, and into the third inner chamber the plunger having first and second plunger positions and being in coordination with the first and second component positions respectively, the plunger being translationally movable relative to the frame along the axis;
    a wall within the first inner chamber spanning between the platform and the outer enclosure, the wall configured to prevent rotation of the plunger and the unitary shoulder about the axis, the wall being aligned with the flat side of the unitary shoulder;
    a biasing spring within the first inner chamber, engaged with the unitary shoulder, and positioned between the platform and the unitary shoulder, the biasing spring configured to bias the plunger to one of the first or second plunger positions;
    an optical fiber being mounted on the frame and being capable of having a light beam move in the first direction therein at all times and being capable of having the light beam move in the reverse direction in the optical fiber when the component position changes between the first and second component positions and when the plunger position has changed between the first and second plunger positions in coordination with the first and second component positions;
    a detector for indicating the absence of the reverse direction of the light beam moving in the optical fiber and for indicating the presence of the light beam moving in the first direction in the optical fiber; and
    a prism mounted in the third inner chamber of the frame for redirecting the light beam moving in the first direction in the optical fiber member to at least the axis of the plunger member and for redirecting the light beam moving in the reverse direction from the axis to the optical fiber member, the prism being fixed relative to the frame.

2. The position sensor of claim 1 wherein the structure is an aircraft and includes an operating system wherein the operating system is communicatively coupled to the position sensor.

3. The position sensor of claim 1 wherein:
    the outer enclosure comprises outer peripheral walls, an upper wall, a lower wall;
    the outer enclosure further comprises an upper platform and a lower platform, spaced apart from the upper platform, that define the first, second, and third inner chambers;
    the upper platform and the lower platform are supported by the outer peripheral walls;
    the first inner chamber is defined between the upper wall and the upper platform, the second inner chamber is defined between the upper platform and the lower platform, and the third inner chamber is defined between the lower platform and the lower wall.

4. A position sensor for providing a position signal of a component of an operating system of a structure, the position sensor comprising:
    a frame comprising an outer enclosure and a platform separating inner chambers;
    a plunger, comprising a unitary shoulder with a flat side, reciprocally mounted along an axis on the frame between first and second positions, the plunger being movable relative to the frame;
    a wall spanning between the platform and the outer enclosure, the wall configured to prevent rotation of the plunger and the unitary shoulder about the axis, the wall being aligned with the flat side of the unitary shoulder;
    an optical fiber mounted on the frame and being capable of having a light beam move in a first direction and in a reverse direction in the optical fiber;
    a prism mounted in the frame for redirecting the light beam moving in the first direction in the optical fiber to at least the axis of the plunger member and for redirecting the light beam moving in the reverse direction from the axis to the optical fiber, the prism being fixed relative to the frame;
    a planar reflector mounted to the plunger and having both an inoperative position and an operative position, the planar reflector, when in the operative position, reflecting the light beam from the first direction to the reverse direction to the prism, the prism directing the light beam in the reverse direction into the optical fiber, while providing the position signal of the component via the presence of the reverse direction of the light beam moving in the optical fiber; and
    a light beam absorber mounted in the frame having an inoperative condition and an operative condition, when the light beam absorber is in the operative condition absorbing the light beam while preventing the reverse direction of the light beam in the optical fiber, and the planar reflector being in the inoperative condition when the light beam absorber is in the operative condition, while providing the position signal of the absence of the reverse direction of the light beam in the optical fiber.

5. The position sensor of claim 4 wherein the structure is an aircraft, the operating system is a landing gear operating system operatively mounted within the aircraft, and the component is a landing gear having a lowered position and a raised position within the aircraft.

6. The position sensor of claim 4 wherein:
the light beam absorber is fixedly mounted on the frame; and
the planar reflector is in an inoperative position when the plunger assembly is in the first position and being in the operative position when the plunger assembly is in the second position, and when the planar reflector is in the operative position, the planar reflector is spaced apart and separate from the prism, and the light beam is reflected back to the prism in the reverse direction and the planar reflector prevents the light beam from reaching the light beam absorber.

7. The position sensor of claim 6 including a collimating lens sandwiched between the optical fiber and the prism, the collimating lens focusing the light beam passing from the optical fiber to the prism.

8. A method comprising:
detecting both an absence and a presence of a light beam moving in an optical fiber to determine the position of a component;
moving the light beam in a first direction through an optical fiber;
redirecting the light beam moving in the first direction from the optical fiber using a prism; and
reciprocally moving a plunger relative to the prism and relative to a light beam absorber between first and second positions, the plunger comprising a planar reflector and a unitary shoulder with a flat side, the plunger being restricted from rotational movement via engagement between the unitary shoulder and a wall, wherein in the first position the light beam redirected from the optical fiber is absorbed by the light beam absorber and in the second position the light beam redirected from the optical fiber is reflected by the planar reflector in a reverse direction back to the prism, the prism redirecting the reflected light beam in the reverse direction to the optical fiber.

9. The method of claim 8 wherein the component is a door of an aircraft and the determined position is open or closed.

10. The method of claim 9 wherein the closed position is determined when the plunger is in the second position.

11. The method of claim 10 wherein the open position is determined when the plunger is in the first position.

12. The method of claim 8 including the steps of:
providing a frame; and
reciprocally mounting the plunger on the frame along a central axis;
wherein the plunger is movable relative to the frame and the prism is fixed relative to the frame.

13. The method of claim 8 wherein the reflector is fixed relative to the plunger and the light beam absorber is movable relative to the plunger.

14. The method of claim 8 including the step of positioning the prism in alignment with the light beam moving in the optical fiber.

15. The method of claim 14 including the steps of:
detecting the absence of a light beam moving in the reverse direction in the optical fiber when the plunger is in the first position;
externally moving the plunger to the second position; and
detecting the presence of the light beam moving in the reverse direction in the optical fiber when the plunger is in the second position.

16. The position sensor of claim 1, wherein the unitary shoulder is configured to limit movement of the plunger along the axis.

* * * * *